United States Patent [19]
Rudolph et al.

[11] 3,891,524

[45] June 24, 1975

[54] BUTYRIC ACID DERIVATIVES AS PHOTOSENSITIZERS FOR UNSATURATED COMPOUNDS

[75] Inventors: Hans Rudolph, Krefeld-Bockum; Hans-Georg Heine; Karl Fuhr, both of Krefeld; Hermann Schnell, Krefeld-Uerdingen, all of Germany

[73] Assignee: Bayer Aktiengesellschaft, Germany

[22] Filed: Aug. 27, 1974

[21] Appl. No.: 501,188

Related U.S. Application Data

[62] Division of Ser. No. 411,422, Oct. 13, 1973, which is a division of Ser. No. 867,939, Oct. 20, 1969, Pat. No. 3,824,284.

[30] Foreign Application Priority Data

Nov. 6, 1968  Germany............................ 1807301

[52] U.S. Cl. ... 204/159.15; 117/93.31; 204/159.23; 204/159.18; 260/28.5 A; 260/89.5 A; 260/93.5 S; 260/473 A; 260/520; 260/559 R; 260/861; 260/869

[51] Int. Cl. ........................... B01j 1/10; B01j 1/12

[58] Field of Search...... 204/159.18, 159.23, 159.24, 204/159.15; 96/115 P, 115 R; 260/559 R

[56] References Cited
UNITED STATES PATENTS

| | | | |
|---|---|---|---|
| 3,657,088 | 4/1972 | Heine et al. ................... | 204/159.15 |
| 3,824,284 | 7/1974 | Rudolph et al. ................. | 204/159.23 |

OTHER PUBLICATIONS

Yokoyama et al., Bulletin of Chem. Soc. Japan, 38 (1965) pp. 1501–1503.

*Primary Examiner*—Murray Tillman
*Assistant Examiner*—Richard B. Turer
*Attorney, Agent, or Firm*—Connolly and Hutz

[57] ABSTRACT

The invention relates to γ-Hydroxy-γ-phenyl-γ-benzoylbutyric acids, the esters and amides thereof, which are useful photosensitisers for the photopolymerisation of polymerisable compounds or compound mixtures including mixtures of unsaturated polyesters and copolymerisable monomeric compounds.

10 Claims, No Drawings

BUTYRIC ACID DERIVATIVES AS PHOTOSENSITIZERS FOR UNSATURATED COMPOUNDS

CROSS REFERENCE TO RELATED APPLICATIONS

This application is a division of application Ser. No. 411,422 filed Oct. 13, 1973 which, in turn, is a division of application Ser. No. 867,939 filed Oct. 20, 1969 and now issued as U.S. Pat. No. 3,824,284.

The object of the present invention are γ-hydroxy-γ-phenyl-γ-benzoylbutyric acid compounds of formula

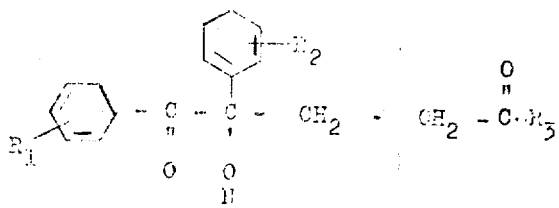

in which $R_1$ and $R_2$ are identical or different and represent hydrogen, lower alkyl having 1 to about 4 carbon atoms, methoxy or halogen, $R_3$ represents —OH, —$OR_4$ or optionally substituted —$NH_2$, and $R_4$ represents lower alkyl having 1 to about 4 carbon atoms, and the lactones of formula

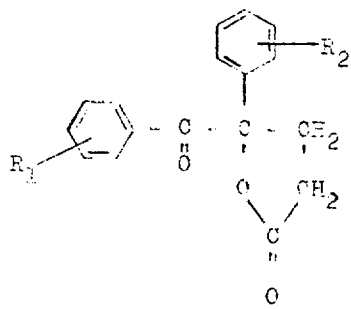

Examples of such compounds are:

2,722,512 and 2,488,828 and French Pat. No. 1,450,589), which are also benzoin derivatives, none has been able to find acceptance in industry. As the reasons for this, the inadequate storage stability in the dark and the excessively low reactivity of the polymerisable compounds mixed with such sensitisers, and at times also the discolouration of the polymers on prolonged storage in daylight, should be mentioned; furthermore, some of the compounds known as sensitisers are difficult to obtain.

Against this, the compounds according to the invention are easily obtainable, reactive substances, mixtures of which with polymerisable compounds are storage-stable for particularly long periods in the dark. The compounds according to the invention also behave satisfactorily as regards discolouration of the polymers in daylight. Because of their content of reactive groups they can also be easily built chemically into the compounds to be polymerised, for example into unsaturated polyesters.

When the compounds are used as photosensitisers they are appropriately employed in amounts of from about 0.1 to about 5 percent by weight, preferably of from about 0.5 to about 2.5 percent by weight, either by themselves or mixed with one another or mixed with photosensitisers of a different nature. Suitable polymerisable compounds are all substances of which the carbon-carbon double bonds are activated by, for example, halogen atoms or carbonyl, cyanide, carboxyl, ester, amide, ether or aryl groups as well as carbon double bonds and carbon triple bonds. As examples there may be mentioned: styrene, vinyl toluene, divinyl benzene, vinyl acetate, vinyl chloride, vinylidene chloride, vinyl methyl ketone, acrylic and methacrylic acid, esters thereof such as the methyl, ethyl and allyl ester, their amides and nitriles, and other allyl esters, such as allyl acetate, phthalic acid diallyl ester and phosphoric acid triallyl ester, and mixtures of such compounds.

Moulding and coating compositions of mixtures, stabilised in the usual manner, of unsaturated polyesters and copolymerisable monomeric compounds can be used particularly advantageously, and unsaturated polyesters are here, as usual, to be understood as polycondensation products of α,β-unsaturated dicarboxylic acids such as, for example, maleic acid and fumaric

| | | °C |
|---|---|---|
| γ-Hydroxy-γ-phenyl-γ-benzoylbutyric acid, | melting point | 109°–114° |
| γ-Hydroxy-γ-phenyl-γ-benzoylbutyric acid-γ-lactone | boiling point (0.2 mm Hg) | 175°–180° |
| γ-Hydroxy-γ-phenyl-γ-benzoylbutyric acid methyl ester | melting point | 74°–77° |
| α-(β-Carbonamido-ethyl)-benzoin | melting point | 152°–153° |
| α-(β-Carbonamido-ethyl)-4,4'-dimethyl-benzoin | melting point | 155°–156° |
| α-(β-Carbonamido-ethyl)-4,4'-dimethoxy-benzoin | melting point | 148°–149° |
| α-(β-Carbonamido-ethyl)-4,4'-dichloro-benzoin and | melting point | 152°–153° |
| α-[β-(N-Methoxymethyl)-carbonamido-ethyl]-benzoin | melting point | 98°–99° |

A further object of the invention is the use of these compounds as photosensitisers for the photopolymerisation of unsaturated compounds.

Of the compounds already proposed as photosensitisers in the literature (compare U.S. Pat. Nos. 2,367,661, acid, with polyols such as, for example, ethylene glycol and propanediol-1,2. A part of the unsaturated acids can be replaced by saturated acids, such as, for example, phthalic acid. Further modifications are possible through building-in monobasic acids and monohydric alcohols. So-called air-drying moulding compositions which in addition to the radicals of α,β-unsaturated dicarboxylic acids also contain β,γ-unsaturated ether radicals can also be employed, either as a constituent of the polyesters or as a constituent of further components of the mixture.

By copolymerisable monomeric compounds there are to be understood the unsaturated compounds which are usual in polyester technology, having vinyl groups which are optionally substituted in the α-position, or allyl groups which are optionally substituted in the β-position, preferably styrene.

The photopolymerisable compounds or mixtures can be stabilised by the addition of usual inhibitors, such as hydroquinone, in the known amounts. Polymerisation catalysts, for example peroxides, can optionally also be conjointly employed in the usual manner. In conjunction with the use of ketone hydroperoxides, metal compounds, for example cobalt naphthenate, can be added for accelerating complete cure. In this case the storage stability of the photopolymerisable compositions is admittedly lowered. It is therefore advisable when manufacturing lacquer coatings to work in accordance with the so-called active primer method in which the coating composition is applied onto a peroxide-containing layer which has beforehand been applied to the substrate.

It is particularly advantageous to employ the new compounds in coating compositions to which paraffin or wax or wax-like substances are added which float to the surface at the start of the polymerisation and prevent the inhibiting action of atmospheric oxygen.

In order to protect light-sensitive substrates, for example light timbers, small amounts of customary ultraviolet absorbers may be added to the moulding and coating compositions without the reactivity being significantly impaired. Furthermore, small amounts of customary carriers and fillers as well as agents for conferring thixotropy, such as glass fibres, synthetic fibres, silica and talcum, can be present during the photopolymerisation.

As radiation sources for carrying out the photopolymerisation, it is possible to use natural sunlight or artificial radiation sources of which the emission lies in the range of about 250 to about 500 mμ, preferably from about 300 to about 400 mμ. Mercury vapour lamps, xenon lamps or tungsten lamps are for example suitable. The compositions also rapidly cure to give colourless moulded and coated articles under the ultraviolet and visible radiation of low energy fluorescent lamps emitting rays of about 300 to about 580 mμ.

When manufacturing mouldings from the sensitised compositions it proves particularly advantageous to be able to cure the compositions by appropriately metered irradiation without a significant heating effect, as a result of which larger mouldings can also be obtained free of cracks. In the absence of peroxides and metal accelerators the cure can also optionally be interrupted through placing the material in darkness and completed at any desired time after storing the prepolymers thus obtained.

The new compounds can be manufactured in a manner which is in itself known by addition of acrylic acid derivatives to benzoins and optionally further reaction of the adducts.

γ-Hydroxy-γ-phenyl-γ-benzoylbutyric acid can for example be obtained in accordance with the following instruction: 20 ml of acrylic acid ethyl ester and 50 ml of 10 percent aqueous sodium hydroxide solution are added at 70°C to a solution of 21.2 g of benzoin in 200 ml of tert.-butanol. Thereafter the reaction mixture is allowed to cool and diluted with a 5-fold amount of water, and unreacted benzoin is filtered off. The filtrate is carefully acidified and extracted with ether. After the usual working-up a crude product is obtained from which 23 g of crystals separate out after addition of benzene. After recrystallisation from ether/petroleum ether 8.5 g of white crystals are obtained. Melting point 109°–114°C (cyclisation to give the lactone).

γ-Hydroxy-γ-phenyl-γ-benzoylbutyric acid-γ-lactone can for example be obtained in accordance with the following instruction: 43 g of acrylic acid ethyl ester and 50 ml of 10 percent aqueous sodium hydroxide solution are added to a solution of 25 g of benzoin in 200 ml of tert.-butanol at 70°C. Thereafter the reaction solution is mixed with 1 l of water and cooled. The unreacted benzoin is filtered off and the alkaline filtrate is acidified. After the usual working-up 15.6 g of crude acid are obtained and are dissolved in benzene and filtered through silica gel. 9.3 g of oil lactone can be obtained in a pure form by distillation. Boiling point 175°–180°C (0.2 mm Hg); $n_D^{30}$ 1.5895–1.5907.

α-(β-Carbonamido-ethyl)-benzoin can for example be obtained in accordance with the following instruction: a mixture of 12 g of acrylonitrile and 30 g of 10 percent potassium hydroxide solution is added at 60°C to a solution of 42.5 g of benzoin in 600 g of tert.-butanol. Thereafter the mix is allowed to cool and is introduced into 3 l of ice water, and the precipitate which has separated out is filtered off and rinsed with water. After recrystallisation from ethyl acetate 25 g of α-(β-carbonamido-ethyl)-benzoin, melting point 152°–153°C, are obtained.

The amide can however also for example be obtained in the following manner: a mixture of 7.1 g of acrylamide and 30 ml of 10 percent sodium hydroxide solution is added at 60°C to a solution of 21.2 g of benzoin in 250 ml of tert.-butanol. Thereafter the mix is allowed to cool and is introduced into 3 litres of ice water, and the precipitate which has separated out is filtered off and rinsed with water. The precipitate is taken up in benzene and filtered through silica gel. Hereupon 13.5 g of unchanged benzoin and 7.3 g of the amide described above (melting point 152°–153°C) are obtained.

The methyl ester can for example be manufactured in the following manner: 3 g of the free acid are dissolved in 10 ml of ether, mixed with excess ethereal diazomethane solution and left to stand for 15 minutes at room temperature. After evaporation of the ether and recrystallisation of the residue from ether/petroleum ether, 1.7 g of γ-hydroxy-γ-phenyl-γ-benzoylbutyric acid-methyl ester are obtained. Melting point 74°–77°C.

EXAMPLE 1

10 g of extracted and freshly distilled acrylic acid methyl ester are mixed with 0.1 g of α-(β-carbonamido-ethyl)-benzoin.

The mixture is illuminated with a mercury vapour high pressure lamp (Philips HPK 125 W/L) through quartz glass in a waterbath at 24°C, at a distance of 10 cm. The solution of the sensitiser in the monomer is at the same time contained in a quartz glass of internal diameter 1.7 cm under a nitrogen atmosphere. The illumination time is 2½ minutes. Immediately after illumination the quartz glass is introduced into an acetone/solid carbon dioxide mixture in order to prevent a thermal polymerisation. The solution of the polymer in the monomer and the solid polymer particles which are present on the inside of the quartz glasses on the side facing the mercury vapour high pressure lamp are transferred into a small round flask with the aid of small amounts of a solvent (methylene chloride).

Thereafter unpolymerised monomeric constituents and the solvent are distilled off in a rotating evaporator. After drying in vacuo to constant weight at 60°C, the quantity of polymer amounts to 12.8 percent by weight.

If the sensitiser is absent, the quantity of polymer is less than 0.1 percent.

EXAMPLE 2

An unsaturated polyester manufactured by condensing 152 parts by weight of maleic anhydride, 141 parts by weight of phthalic anhydride and 195 parts by weight of propanediol-1,2 is mixed with 0.045 parts by weight of hydroquinone and dissolved in styrene to give a 65 percent by weight solution.

Two parts by weight of two different known photosensitisers on the one hand and of three different photosensitisers according to the invention on the other hand are added to 100 parts by weight at a time of this form in which the resin is supplied, and the mixtures are stored at 60°C, with exclusion of light, until they gel. Table 1 gives the sensitisers and the storage stability values at 60°C.

Table 1

Storage stability in the dark of the form in which a typical polyester resin is supplied, with the addition of 2 parts by weight of sensitiser.

| Sensitiser | Storage Stability at 60°C |
|---|---|
| Benzoin | less than 1 day |
| Benzoin ethyl ether | less than 1 day |
| γ-Hydroxy-γ-phenyl-γ-benzoylbutyric acid | more than 10 days |
| γ-Hydroxy-γ-phenyl-γ-benzoylbutyric acid-γ-lactone | more than 10 days |
| γ-Hydroxy-γ-phenyl-γ-benzoylbutyric acid methyl ester | more than 10 days |

EXAMPLE 3

20 parts by weight of styrene, 1 part by weight of a 10 percent by weight solution of paraffin (melting point 52°–53°C) in toluene, as well as benzoin or photosensitisers according to the invention in equimolar amounts, are mixed into 100 parts by weight at a time of the form in which the resin is supplied which has been described in example 2. The solutions thus obtained are applied to glass plates by means of a film spreader (500 μ) and are illuminated with radiation from a fluorescent lamp (Osram L 40W/70-1) at a distance of 5 cm.

Table 2 gives the times for the paraffin to float to the surface and the times until a pencil hardness > 6 H is reached.

Table 2

| Sensitiser | Additive in parts by weight relative to form in which resin is supplied | Time for paraffin to float to surface, after minutes | Pencil hardness >6 H, after minutes |
|---|---|---|---|
| Benzoin | 1.06 | 4.9 | 20.0 |
| γ-Hydroxy-γ-phenyl-γ-benzoylbutyric acid | 1.42 | 1.9 | 16.0 |
| γ-Hydroxy-γ-phenyl-γ-benzoylbutyric acid methyl ester | 1.49 | 2.6 | 19.0 |
| α-(β-Carbonamido-ethyl)-benzoin | 1.42 | 1.9 | 16.0 |

We claim:

1. In the process of preparing coatings and molded bodies by photopolymerizing a mixture of at least one ethylenically unsaturated polymerizable compound and a photosensitizer by irradiating said mixture with a radiation source, the improvement which comprises employing 0.1 to 5 percent by weight, based on said ethylenically unsaturated compound, of a photosensitizer of the formula

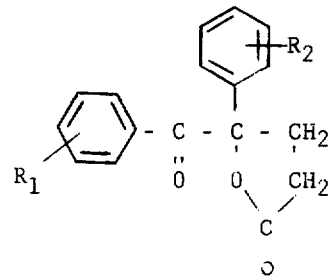

wherein $R_1$ and $R_2$ are identical or different and are selected from the group consisting of hydrogen, alkyl having 1 to 4 carbon atoms, methoxy and halogen.

2. The process of claim 1 wherein the photosensitizer is employed in an amount of 0.5 to 2.5 percent by weight based on the ethylenically unsaturated compound.

3. The process of claim 1 wherein $R_1$ and $R_2$ of said formula are hydrogen.

4. The process of claim 1 wherein said at least one ethylenically unsaturated compound is a mixture of an unsaturated polyester which is the condensation product of an α,β-dicarboxylic acid and a polyol and an ethylenically unsaturated copolymerizable monomer.

5. The process of claim 1 wherein each ethylenically unsaturated compound is selected from the group consisting of styrene, vinyl toluene, divinylbenzene, vinyl acetate, vinyl chloride, vinylidene chloride, vinyl methyl ketone, acrylic acid, methacrylic acid, acrylic acid methyl ester, methacrylic acid methyl ester, acrylic acid ethyl ester, methacrylic acid ethyl ester, acrylic acid allyl ester, methacrylic acid allyl ester, acrylic acid amide, methacrylic acid amide, acrylic acid nitrile, methacrylic acid nitrile, allyl acetate, phthalic acid diallyl ester, phosphoric acid triallyl ester and mixtures thereof.

6. A mixture of at least one ethylenically unsaturated polymerizable compound and from 0.1 to 5 percent by weight, based on said ethylenically unsaturated compound of a photosensitizer of the formula

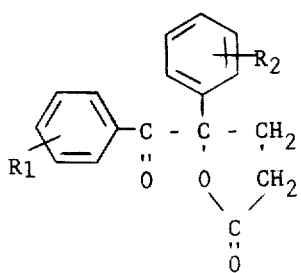

wherein $R_1$ and $R_2$ are identical or different and are selected from the group consisting of hydrogen, alkyl having 1 to 4 carbon atoms methoxy and halogen.

7. The composition of claim 6 wherein the photosensitizer is employed in an amount of 0.5 to 2.5 percent by weight based on the ethylenically unsaturated compound.

8. The composition of claim 6 wherein $R_1$ and $R_2$ of said formula are hydrogen.

9. The composition of claim 6 wherein said at least one ethylenically unsaturated compound is a mixture of an unsaturated polyester which is the condensation product of an $\alpha,\beta$-dicarboxylic acid and a polyol and an ethylenically unsaturated copolymerizable monomer.

10. The composition of claim 6 wherein each ethylenically unsaturated compound is selected from the group consisting of styrene, vinyl toluene, divinyl benzene, vinyl acetate, vinyl chloride, vinylidene chloride, vinyl methyl ketone, acrylic acid, methacrylic acid, acrylic acid methyl ester, methacrylic acid methyl ester, acrylic acid ethyl ester, methacrylic acid ethyl ester, acrylic acid allyl ester, methacrylic acid allyl ester, acrylic acid amide, methacrylic acid amide, acrylic acid nitrile, methacrylic acid nitrile, allyl acetate, phthalic acid diallyl ester, phosphoric acid triallyl ester and mixtures thereof.

* * * * *